United States Patent
Sandulescu et al.

(10) Patent No.: US 9,514,226 B2
(45) Date of Patent: Dec. 6, 2016

(54) METHODS AND SYSTEMS USEFUL FOR IDENTIFYING THE MOST INFLUENT SOCIAL MEDIA USERS IN QUERY-BASED SOCIAL DATA STREAMS

(71) Applicants: Bogdan Sandulescu, Ramnicu Valcea (RO); Vladimir Oane, Ramnicu Vlacea (RO)

(72) Inventors: Bogdan Sandulescu, Ramnicu Valcea (RO); Vladimir Oane, Ramnicu Vlacea (RO)

( * ) Notice: Subject to any disclaimer, the term of this patent is extended or adjusted under 35 U.S.C. 154(b) by 408 days.

(21) Appl. No.: 13/874,454

(22) Filed: Apr. 30, 2013

(65) Prior Publication Data

US 2013/0304726 A1 Nov. 14, 2013

Related U.S. Application Data

(60) Provisional application No. 61/640,137, filed on Apr. 30, 2012.

(51) Int. Cl.
*G06F 17/30* (2006.01)
*G06Q 10/10* (2012.01)
*G06Q 50/00* (2012.01)

(52) U.S. Cl.
CPC ....... *G06F 17/30864* (2013.01); *G06Q 10/101* (2013.01); *G06Q 50/01* (2013.01)

(58) Field of Classification Search
None
See application file for complete search history.

(56) References Cited

U.S. PATENT DOCUMENTS

| | | |
|---|---|---|
| 8,060,492 B2 | 11/2011 | Nair |
| 9,397,974 B1 * | 7/2016 | Gross ............... H04L 51/32 |
| 2010/0153404 A1 | 6/2010 | Ghosh et al. |
| 2011/0153502 A1 | 6/2011 | Jean-Claude |
| 2011/0231416 A1 | 9/2011 | Goodchild Drake |
| 2011/0282860 A1 | 11/2011 | Baarman et al. |
| 2011/0295626 A1 | 12/2011 | Chen et al. |
| 2011/0307397 A1 | 12/2011 | Benmbarek |
| 2012/0102021 A1 * | 4/2012 | Hill ............... G06F 17/30964 707/711 |
| 2012/0324004 A1 * | 12/2012 | Le ............... G06Q 10/00 709/204 |
| 2015/0106155 A1 * | 4/2015 | Castellanos et al. ....... 705/7.29 |

OTHER PUBLICATIONS

International Search Report (pp. 1-3) for PCT/US2013/038954.
International Search Report (pp. 1-3) for PCT/US2013/038949.

* cited by examiner

*Primary Examiner* — Jay Morrison
(74) *Attorney, Agent, or Firm* — JWIP & Patent Services, LLC; Jacob G. Weintraub, Esq.

(57) ABSTRACT

The present invention relates to novel methods and implementing systems that afford a user the ability to analyze a certain stream of data, e.g., independent of size, and identify the people that influence the conversation.

20 Claims, 3 Drawing Sheets

METHODS AND SYSTEMS USEFUL FOR IDENTIFYING THE MOST INFLUENT SOCIAL MEDIA USERS IN QUERY-BASED SOCIAL DATA STREAMS

RELATED APPLICATIONS

This application claims the benefit of priority from U.S. Provisional Patent Application No. 61/640,137, filed on Apr. 30, 2012, the entirety of which is incorporated herein by reference.

BACKGROUND OF THE INVENTION

In the last 10 years social media has effectively changed the way people communicate online. Millions of blogs, or services like Twitter and Facebook enabled new ways of expression for people worldwide. Billions of messages, blog posts, pictures, videos etc are published on a daily basis. As such, it has become very important for companies to find a way to analyze this real-time stream of information.

Many companies use a social monitoring service like uberVU to collect all mentions of a specific brand, a product, or an event. The way this usually works is by creating a persistent search, which will constantly collect and analyze all the new mentions of a specific brand, a product, or an event. However, for most of these searches there is a huge quantity of data that needs to be analyzed, making it very difficult for a company to identify the people that they should be interacting with, and to analyze how the messages virally spread in the social space.

There are providers of influence metrics, which offer systems that analyze all the data streams from one or more identified users, and compute a general influence rank. These systems may be capable of offering additional deeper analysis; such as identifying the main themes of influence for the users they rank.

The problem with this approach is that it is very difficult to use the same influence metric for all data streams. For example, maybe a user is very popular and influent when the user talks about cars, but the user's influence related to a certain food ingredient is close to 0. Moreover, the existing influence metrics require a prior identification of an influent user, and measure extent of this influence only after such identification.

As such, there is a need for a system that is capable of analyzing large data sets from social monitoring to detect the most influent social media.

SUMMARY OF THE INVENTION

The present invention relates to methods and systems to identify the most influent social media users for any query-based social data stream (e.g., key words and phrases, search terms, search results, or combination thereof, including semantic matches thereof). In particular, the methods and systems are able to analyze a certain stream of data, e.g., independent of size, and identify the people that influence the conversation.

Accordingly, one aspect of the invention provides a system comprising a machine-readable medium having instructions stored thereon for execution by a processor to perform a method for identifying the most influent social media users in query-based social data streams comprising the steps of interfacing with one or more streaming social data sources; collecting one or more mentions that match a search query; storing said mentions on a first server; enhancing said mentions with additional information to produce enhanced mentions; storing said enhanced mentions on a second server; filtering said enhanced mentions into filtered streams; creating a conversation graph from said filtered streams; calculating influence scores from said conversation graph; and outputting the most influent social media users.

In another aspect, the present invention provides a method for identifying the most influent social media users in query-based social data streams comprising the steps of interfacing with one or more streaming social data sources; collecting one or more mentions that match a search query; storing said mentions on a first server; enhancing said mentions with additional information to produce enhanced mentions; storing said enhanced mentions on a second server; filtering said enhanced mentions into filtered streams; creating a conversation graph from said filtered streams; calculating influence scores from said conversation graph; and outputting the most influent social media users, such that the most influent social media users for the streaming social data sources are identified.

DETAILED DESCRIPTION OF THE INVENTION

Figure 1:
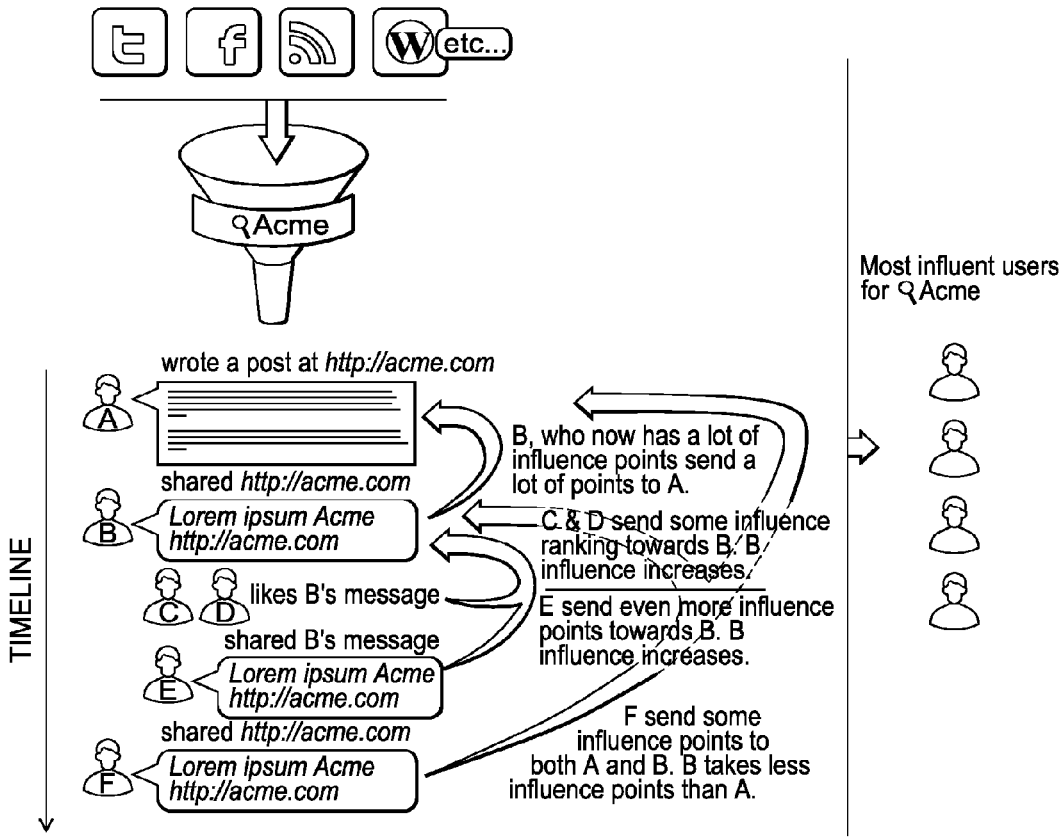
FIG. 1 depicts the flow of data from social media through a system of the present invention using a method of the present invention.

The present invention provides novel methods and implementing systems that afford a user the ability to analyze a certain stream of data, e.g., independent of size, and identify the people that influence the conversation. In particular, the novel methods and systems are analyzing the engagement of users as the users relate to a specific persistent search, and computes an influence ranking system based on the exposure of a user's message, or how "viral" is a message of a user.

The present invention, including novel methods and systems will be described with reference to the following definitions that, for convenience, are set forth below. Unless otherwise specified, the below terms used herein are defined as follows:

I. DEFINITIONS

As used herein, the term "a," "an," "the" and similar terms used in the context of the present invention (especially in the context of the claims) are to be construed to cover both the singular and plural unless otherwise indicated herein or clearly contradicted by the context.

The language "and/or" is used herein as a convention to describe either "and" or "or" as separate embodiments. For example, in a listing of A, B, and/or C, it is intended to mean both A, B, and C; as well as A, B, or C, wherein each of A, B, or C is considered a separate embodiment, wherein the collection of each in a list is merely a convenience.

The language "application programming interface (API)" is art-recognized to describe a protocol intended to be used as an interface by software components to communicate with each other.

The term "interfacing" as used herein, for example in the expression "interfacing with one or more streaming social data sources," describes the means of communication between two entities, for example a system and a data source. In certain embodiments, the interfacing may be bi-directional. In other embodiments, the interfacing may be uni-directional. In particular embodiments, such interfacing may include receiving, responding, and/or assigning an answer to a request.

The language "machine-readable medium" is art-recognized, and describes a medium capable of storing data in a format readable by a mechanical device (rather than by a human). Examples of machine-readable media include magnetic media such as magnetic disks, cards, tapes, and drums, punched cards and paper tapes, optical disks, barcodes, magnetic ink characters, and solid state devices such as flash-based, SSD, etc. Common machine-readable technologies include magnetic recording, processing waveforms, and barcodes. In particular embodiments, the machine-readable device is a solid state device. Optical character recognition (OCR) can be used to enable machines to read information available to humans. Any information retrievable by any form of energy can be machine-readable. Moreover, any data stored on a machine-readable medium may be transferred by streaming over a network.

The language "most influent" social media users" is used herein to describe users of social networks whose activity can influence the other users in the network. The influence is limited to the actions allowed in those certain social networks and may include, but are not limited to, posting/sharing/commenting on certain messages, following or befriending certain users or voting/liking certain messages. In certain embodiments, these users are the at the center of or are considered to be driving the conversation, whose message is being read, shared, discussed, or engaged.

The term "operator" is used herein to describe any person or entity that engages a system or utilizes a method of the invention, e.g., by defining a query-based social data streams.

The language "uniform resource identifier (URI)" is art-recognized to describe a string of characters used to identify a name or a web resource.

The language "Uniform Resource Locator (URL)" is art-recognized to describe a formatted text string used by web browsers, email clients and other software to identify a network resource on the internet.

The term "user" and "social media user" are used interchangeably herein to describe any person that interacts with social media, e.g., an author or someone that increases exposure of the authors work through social media.

The term "spike" is used herein describes a social media insight that represents a sudden increase in social media activity, e.g., data volume for a given stream and/or attributes combination. In one example, the stream tracking a company's competitor is having a large spike in negative mentions, which means massive bad publicity for the competitor; which could mean a potential business opportunity for a company (e.g., how News.me leveraged the closedown of Google Reader in order to gain a larger userbase).

The term "burst" is used herein to describe a spike that shows sustained over-the-average activity. For example, spikes, which are not so volatile (such as an intelligent political move on social media), may turn into bursts of sustained large activity showing potential future trends.

The language "top story" is used herein to describe an online resource for which is a large spike in social media activity within a data stream. For example, if a newspaper has published a review of a product, and that review goes viral (e.g., people start sharing it, etc.), it will show up as a top story in the product's stream.

II. METHODS OF THE INVENTION

In one embodiment, the present invention provides a method for identifying the most influent social media users in query-based social data streams comprising the steps of
  interfacing with one or more streaming social data sources;
  collecting one or more mentions that match a search query;
  storing said mentions on a first server;
  enhancing said mentions with additional information to produce enhanced mentions;
  storing said enhanced mentions on a second server;
  filtering said enhanced mentions into filtered streams;
  creating a conversation graph from said filtered streams;
  calculating influence scores from said conversation graph; and
  outputting the most influent social media users,
such that the most influent social media users for the streaming social data sources are identified.

In another embodiment, the method further comprises the step of identifying an influent social media user.

In another embodiment, the method further comprises the step of reporting one or more of the most influent social media users.

In certain embodiments, the first server is the same as the second server.

In certain embodiments, the step of collecting the mentions further comprises establishing a search inquiry, e.g., an iterative search query.

In certain embodiments, the step of collecting the mentions may be limited by prescribed time interval or may be continual.

In certain embodiments of the invention, the data stream comprises greater than 500,000 mentions, e.g., greater than 1,000,000 mentions, e.g., greater than 2,000,000 mentions, e.g., greater than 5,000,000 mentions, e.g., e.g., greater than 10,000,000 mentions.

A. Data Collection

In the methods of the present invention, the data analyzed is in the form of mentions or messages, which are used interchangeably herein. A "mention" or "message" is a post originated on a social media platform, and associated information. Mentions are usually collected by matching certain keywords using queries or by matching certain mentions parameters. In certain embodiments, a mention may comprise an author; a date, a main message (depending on the type this can be text, image, video, audio or a combination thereof). In a particular embodiment, the mention may comprise a location where the mention was created (either as GPS coordinates or text), a comment thread, and/or the number and list of people who liked or favorited the mention.

Collection of all the mentions from a query-based social data stream, i.e., derived from data streams that match a specific query (e.g., key words and phrases, search terms, search results, or combination thereof, including semantic matches thereof) may be made from any available social network. This step of collection ensures that the stream being analyzed is related to the topic of interest, i.e., the query, to identify influencers.

The sources of data may be any social network (e.g., Twitter, Facebook, Google+, Pinterest, Instagram, LinkedIn etc) or websites where an author can be uniquely identified (e.g., blogs, boards, etc). Access to this data may be acquired in a variety of ways. In certain embodiments, the data may be acquired through data partnerships with the main social media players or data reseller, publicly available API (application programming interface), and/or scraping or other forms of HTML manipulation.

In certain embodiments, information related to authors may be comprise one or more of the following: a name: either as a nickname or full name (real or invented), a picture or a set of pictures, a description, and/or a list of other website and social profiles the user can be found on. In alternative embodiments, information related to authors may be comprise a URI (uniform resource identifier).

The amount of data collected may depend upon the slice of the timeline, or time interval, which is being analyzed. For example, it could be a day, a week or a month. In certain embodiments, for real-time results the slice should be as small as possible, probably hours.

In certain embodiments, the invention is supported by methods and systems that allow queries from different operators to be saved & managed. In certain embodiments, a mechanism to collect data that match those queries may be included, and can be part of the same backend system. In particular embodiments, the mentions collected for those queries may also be annotated with meta-information, e.g., as much as possible; including the location, the language or the platform of the mention. In a specific embodiment, the back end system may create archives of all the mentions collected. In such cases, a record of all the messages posted about a specific topic is presented, and the historical record may be as long as the period needed for which to provide influence.

B. Data Enhancement

In the methods of the present invention, the collected mentions are enhanced. Such enhancements are applied on mentions to provide additional information to be stored on the server along with the mentions, i.e., producing enhanced mentions, and assist in filtering the data. In certain embodiments, these enhancements may include one or more of the following: the sentiment of the mention, i.e., whether the author has a positive, negative or neutral opinion on the subject in discussion; the language of the mention; the location: city, country; the gender of the author; the potential reach of each mention, i.e., how many people will read it; and the following of an author.

In the methods of the present invention, the data is filtered into streams, e.g., using the enhancement added to the mention. The importance of this filtering is it separates the global conversation into a meaningful subset. In certain embodiments, the stream is ordered by time, i.e., meaning the most recent mentions are at the top. Each enhanced mention is filtered, and will have some detectors, or filters, that will go through each to create a filtered stream, which may be analyzed to provide statistical data, e.g., numerically or graphical in nature.

Mentions and streams are saved, e.g., in databases, on a server. The types server and/or the database depend on the volume of data and the desired use of the data, e.g., wherein the data is accessed by a specific timeframe. Moreover, two pieces of information on which computation of social spikes may be based, may be stored on the server: the raw mention data, and the statistics gathered from those mentions.

In certain embodiments, the method is capable of detecting people influencing the social conversation for a specific, topic. This is achieved by filtering the conversations from which the mentions derive into streams. The most popular filtering stream is by keyword matching using boolean operators. For example, the topics for filtering may be selected from one or more of brand names, product names, names of persons, campaigns or events, and market terms. Moreover, in certain embodiments, the streams can be further filtered down using generic terms such as: location, e.g., just for mentions in Brazil; language, e.g., people speaking Japanese; social network, e.g., on Twitter( ) sentiment, e.g., people saying nice things about Xbox®; and gender, e.g., women discussing the new maternity laws.

C. Conversation Graphs

Figure 3:
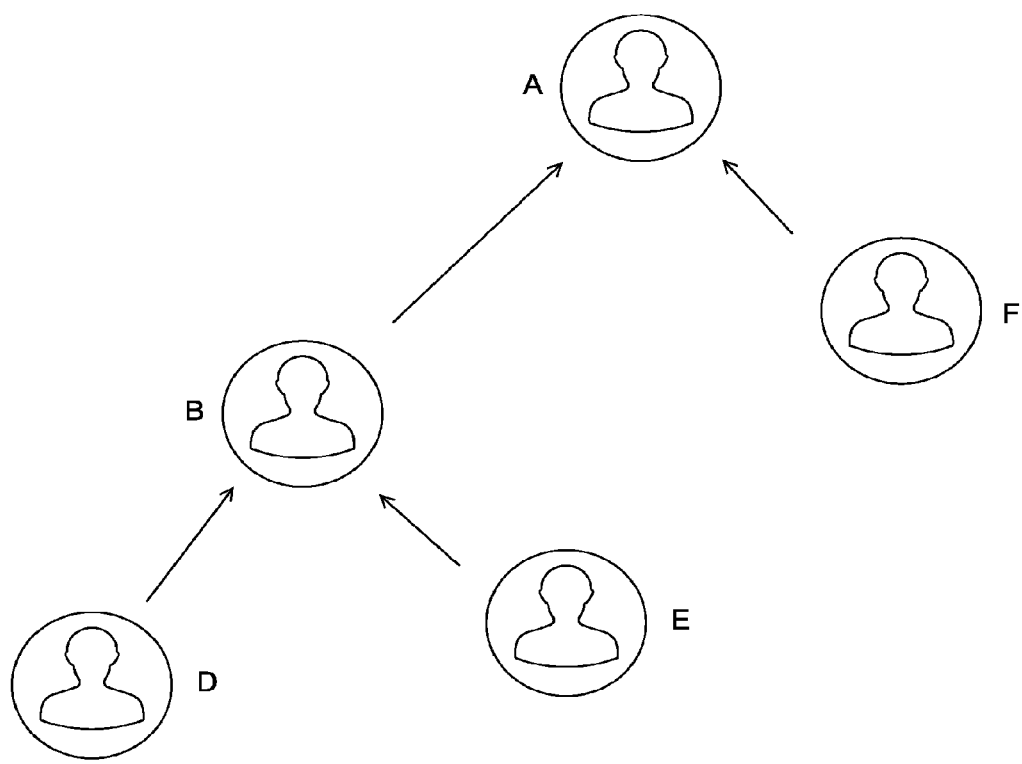
FIG. 3 depicts one example of a conversation graph created in accordance with the methods of the present invention.

Based on the mentions in a certain filtered stream, a conversation graph is created. This conversation graph is stream-specific, affording the ability to filter influencers by their topical influence score instead of a global one. Moreover, the nodes in the graph represent authors of the mentions collected in each filtered stream. In certain embodiments, such node may contain multiple identities of the same person (if user X identified on Twitter is the same as user Y on LinkedIn). FIG. 3 shows one example of a conversation graph created in accordance with the methods of the present invention.

For each message the relationship with the previous and subsequent messages is identified. A message "linking" to another user's message (post, blog, video etc) may be considered a "vote" for that first user's message. For example, a link from message A (post, blog, video etc) to message B may be interpreted as a vote, by message A, for message B. In certain embodiments, the analysis considers sheer volume of votes as well as the weight of the message that casts the vote. See, for example, FIG. 1.

A line pointing from A to B means the A amplified the message posted by B by a form of social sharing. Social sharing can differ from social network to social network and these actions can come and go as new social networks emerge or old social networks shut down. This amplification, for example, may be result in a new mention, or just amplify an already existing mention by exposing it to new audiences, which may be traced back to another mention that has another author.

Each social action has a certain weight depending on the importance of the action. For example a favoriting a tweet is less impactful that retweeting that tweet because the audience in the later case is bigger. The weights of those actions can and will change all the time as the social networks change their functionality and the number of users in each social networks goes up or down. In particular embodiments, new actions can be added or removed as the usage of certain social networks increases or decreases.

The nodes on the conversation graph, or authors of the mentions, are connected by directed weighted edges. Such nodes are added/removed whenever a new author is detected in the context of the stream. This author will then have a timeframe in which to prove his/her influence, e.g., to an algorithm, or else be removed, e.g., and then re-added again later, when the next action related to the author occurs. New edges are added whenever a user A amplifies a message of another user B for the first time, and the edge contains information related to the strength of the amplification and when it took place. Similar to nodes, the faithfulness of user A with respect to user B has to be shown constantly by amplifications in order for the edge to remain in the graph, otherwise it will fade out in time. Nodes may be updated whenever new information is gathered about the authors they represent; this can mean updates due to the number of social actions (the author has published a new message), or even due to the properties of the author (name has changed, or the number of followers). Edges may be updated either by the passage of time (they fade away), or by new information supporting the faithfulness of users which amplify the social actions of other users.

In certain embodiments, a link may be selected from a share on Facebook or similar social networks; a thumbs up, like or retweet; the sharing of the same resource by user A, who is following user B (and posted the resource earlier); or friending of following a user. In this respect, not all the links must cast the same voting score, i.e., some may be more valuable than others.

In certain embodiments, a link may be selected from one or more examples using today's social networks: a tweet mentioning another user (e.g., Twitter); a retweet of a mention (e.g., Twitter); favoriting a mention (e.g., Twitter); liking a post (e.g., Facebook); sharing a post (e.g., Facebook, Google+, or LinkedIn); +1 on a post (e.g., Google+); posting a link to a blog (e.g., any social network); and commenting (e.g., almost any social network).

The size of the graph will depend on the timeframe to detect influencers for and the size of the stream. For example, for a very large stream it may be useful to analyze the last day, and thus create a graph based on the last 24 hours. Alternatively, for a small stream it may be more useful to analyze influencers for a 7 days window. In certain embodiments, the timeframe, or time interval, may be established from the outset, during the process, or may be pre-programmed into the system implementing the method.

In certain embodiments, the graph may be continuously updated, e.g., as the system gathers mentions from around social media, i.e., filtered by the current stream. As such, referring back to the example where A links to B example: A links to B means A increased the reach of the message B created. Both nodes and edges within this graph are filtered in the context of the stream. This means that it's possible for the same user A to appear in two graphs for two different streams with completely different roles and influence (e.g. where A might be an influencer for stream S1 and not for S2).

Each message, linked to an author, is assigned an influence rank that varies with time. Based on the author's history within the scope of that search we compute an influence rank for the authors.

D. Calculating Influence Scores

Influence scores may be computed based on the previously mentioned graph, by an algorithm which is triggered based on the volume of the stream. If a smaller stream is being analyzed, it may be triggered in real-time; while for larger streams batches of mentions may be collected in order to process them as a group.

The algorithm examines the graph iteratively and assigns an influence score to each node (author) at each step. This influence score is specific to the current stream and is evolved/resolved by a series of iterations until the score is stable. The number of iterations is proportional to the maximal chain of consecutive elements found in the graph, e.g., a recursive algorithm.

Each iteration of the algorithm evolves these scores by computing the outreach of an author A towards the rest of the graph, given the individual probabilities found on each edge that the next connected node will amplify an action of A. This probability (similar to faithfulness) is computed based on the interactions between the two users A and B directly connected by an edge. Since interactions between social media authors are very dynamic, meaning new messages between them happen all the time, in certain embodiments, the graph is refreshed and the scores are refreshed to reflect the changes, e.g., in a continual fashion.

As an example: if A is a potential influencer, and B1, B2, B3 have recently amplified the social actions of A, based on those interactions (their strength and frequency) we are able to compute the probability that they will amplify again a new message from A for the current stream.

At the finish of all iterations, a stable influence score will be assigned for each author (e.g., with a value between 0 and 1) which will measure the potential for amplification of a new message of the author.

E. Outputting Influencers

Figure 2:
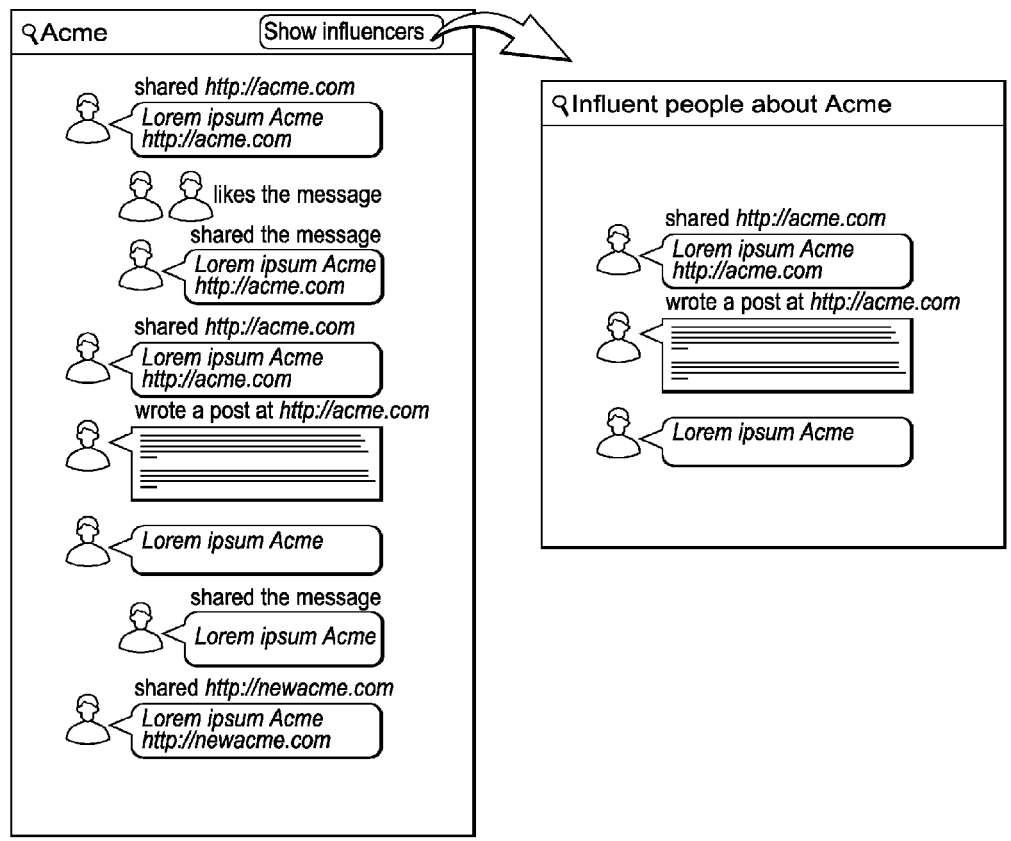
FIG. 2 depicts the identification of the most influent people from a data stream along with the relevant and useful information described herein.

Once the algorithm is triggered, and stable influence scores are computed for all authors within the graph, the top users may then be extracted. In a particular embodiment, the extracted top users may be annotated with visual information that justifies its influence score, e.g., selected from one or more of the following: a user picture and personal information, if available (this includes profiles on all known social networks, for example); users amplifying the actions together with information on the "faithfulness" (how probable is an user to amplify a new social action of the influencer); or other contextual information determined by our system and related to the current stream, such as a topic cloud. In specific embodiments, these annotations may be stored in a database on a server, e.g., in a contextual manner (a user can have multiple entries for multiple streams), and may be displayed to justify the choice of the influencer. See, for example, FIG. 2.

In certain embodiments, influencers may be displayed in a graphical user interface (GUI) where users can select which influencers they are interested in, based on streams, group of streams, or influence score.

Operators of the system may also specify both volatile filtering criteria in order to explore the existing influencers, and persistent ones, causing certain classes of influencers to never be generated again.

In certain embodiments, the methods may be used to filter a social media stream based on an influence threshold. For example, out of all the messages collected for a certain persistent search only the authors and messages that exceed the threshold will be reported. In particular, this could be very useful for an operator to identify: who are the persons/users driving the discussion forward and use the information to engage with them (e.g., to reward them, or to send them products for reviews etc); to identify complaints from influent people/users who can generate a lot of negative sentiment towards a brand, product etc; or to identify the people/users who drive the most buzz in a marketing campaign.

In certain embodiments, the methods may be used to use the influence rank to augment the profile that are usually stored in a customer relationship management system (CRM). Each customer, lead or contact in a CRM system can have a influence rank attached to it so a sales or support person will know how to generate buzz for a topic.

In certain embodiments, the methods may be used to get analytics like: a chart with the most influent users and messages. The chart will change depending on the time selection (a chart for the last month can be very different from one for the last year) and can be further filtered, e.g., based on social network, geolocation (country, state, city), language, gender or other various demographics factors.

In certain embodiments, the methods may be used to generate a web chart showing the distribution of messages from the most influent users to the less influent ones. The distribution chart can be time based (and will look like a timeline), location based (it will look like a heat-map) etc.

In certain embodiments, the methods may be used to generate a graph showing the average influence of the top 10 users for that search stream. This would be a good indicator of the level of influence a topic attracts, e.g., and the number can be use to compare two similar search streams

III. SYSTEMS OF THE INVENTION

In another embodiment, the present invention provides a system comprising a machine-readable medium having instructions stored thereon for execution by a processor to perform a method for identifying the most influent social media users in query-based social data streams comprising the steps of
- interfacing with one or more streaming social data sources;
- collecting one or more mentions that match a search query;
- storing said mentions on a first server;
- enhancing said mentions with additional information to produce enhanced mentions;
- storing said enhanced mentions on a second server;
- filtering said enhanced mentions into filtered streams;
- creating a conversation graph from said filtered streams;
- calculating influence scores from said conversation graph; and
- outputting the most influent social media users.

In another embodiment of the system, the method further comprises the step of identifying an influent social media user.

In another embodiment of the system, the method further comprises the step of reporting one or more of the most influent social media users.

In certain embodiments of the system, the first server is the same as the second server.

In certain embodiments of the system, the step of collecting the mentions further comprises establishing a search inquiry, e.g., an iterative search query.

In certain embodiments of the system, the step of collecting the mentions may be limited by prescribed time interval or may be continual.

In certain embodiments of the system, the data stream comprises greater than 500,000 mentions, e.g., greater than 1,000,000 mentions, e.g., greater than 2,000,000 mentions, e.g., greater than 5,000,000 mentions, e.g., e.g., greater than 10,000,000 mentions.

In certain embodiments, the system affords the ability to accept input for the purpose of marking a item of data as not relevant, e.g., providing the ability of the system to learn with respect to refinement and improved calculations/analysis. For example, in one embodiment such input may be priority level indicator.

In certain embodiments, the instructions stored on the machine-readable medium are online software or offline software.

In certain embodiments, the software is an online application, e.g., a web-based application or a cloud-based application.

In certain embodiments, the software is an offline application.

In certain embodiments, the data is selected from the group consisting of social network or websites where an author can be uniquely identified, and any combination thereof.

In certain embodiments, the machine-readable medium is selected from the group consisting of magnetic media, punched cards, paper tapes, optical disks, barcodes, magnetic ink characters, and solid state devices.

The system, in certain embodiments, may be part of a media monitoring, their engagement console, customer relationship management or analytics service. Moreover, the system may be a web application accessible in an Internet browser, a desktop software running on Windows, Mac OS, Linux (or any other operating system), or a mobile application (available on smartphones or tablets).

In certain embodiments, the system can be delivered as an API method, e.g., which may be accessed remotely by any other software.

In certain embodiments, the system may be used as a widget that you can embed in any HTML enabled app. In a particular embodiment, the widget may display all the metrics (like top influencers for a topic or influence distribution map etc). In a specific embodiment, the widget layout may be customized to fit the application or page in which it is embedded.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

What is claimed is:

1. A system comprising: a non-transitory machine-readable medium having instructions stored thereon for execution by a processor to perform a method for identifying the most influent social media users in query-based social data streams comprising the steps of
- interfacing with one or more streaming social data sources;
- collecting one or more mentions that match a search query;
- storing said mentions on a first server;
- enhancing said mentions with additional information to produce enhanced mentions, wherein each enhanced mention is assigned an author node;
- storing said enhanced mentions on a second server;
- filtering said enhanced mentions into filtered streams;
- creating a conversation graph from said filtered streams;
- calculating influence scores from said conversation graph by iteratively assigning an influence score to each author node of each mention by computing the outreach of one author node towards the rest of the graph based on the individual probabilities found on each author node edge that the next connected node will amplify an action of said author node; and
- outputting the most influent social media users.

2. The system of claim 1, wherein the instructions stored on the machine-readable medium are online software or offline software.

3. The system of claim 1, wherein the software is an online application.

4. The system of claim 3, wherein the software is a web-based application.

5. The system of claim 3, wherein the software is a cloud-based application.

6. The system of claim 1, wherein the software is an offline application.

7. The system of claim 1, wherein the data sources are selected from the group consisting of social networks, websites where an author can be uniquely identified, and any combination thereof.

8. The system of claim 1, wherein the machine-readable medium is selected from the group consisting of magnetic media, punched cards, paper tapes, optical disks, barcodes, magnetic ink characters, and solid state devices.

9. The system of claim 1, wherein the method further comprises the step of identifying an influent social media user.

10. The system of claim 1, wherein the method further comprises the step of reporting one or more of the most influent social media users.

11. The system of claim 1, wherein the first server is the same as the second server.

12. The system of claim 1, wherein the step of collecting the mentions further comprises establishing a search inquiry.

13. The system of claim 1, wherein the step of collecting the mentions may be limited by prescribed time interval or may be continual.

14. A method for identifying the most influent social media users in query-based social data streams comprising the steps of interfacing with one or more streaming social data sources;

collecting one or more mentions that match a search query;

storing said mentions on a first server;

enhancing said mentions with additional information to produce enhanced mentions, wherein each enhanced mention is assigned an author node;

storing said enhanced mentions on a second server;

filtering said enhanced mentions into filtered streams;

creating a conversation graph from said filtered streams;

calculating influence scores from said conversation graph by iteratively assigning an influence score to each author node of each mention by computing the outreach of one author node towards the rest of the graph based on the individual probabilities found on each author node edge that the next connected node will amplify an action of said author node; and outputting the most influent social media users, such that the most influent social media users for the streaming social data sources are identified.

15. The method of claim 14, wherein the method further comprises the step of identifying an influent social media user.

16. The method of claim 14, wherein the method further comprises the step of reporting one or more of the most influent social media users.

17. The method of claim 14, wherein the first server is the same as the second server.

18. The method of claim 14, wherein the step of collecting the mentions further comprises establishing a search inquiry.

19. The method of claim 14, wherein the step of collecting the mentions may be limited by prescribed time interval or may be continual.

20. The method of claim 14, wherein the data sources are selected from the group consisting of social networks, websites where an author can be uniquely identified, and any combination thereof.

* * * * *